United States Patent [19]

Kitai et al.

[11] 4,084,403

[45] Apr. 18, 1978

[54] DRIVING MECHANISM FOR A TIMEPIECE

[75] Inventors: Kiyoshi Kitai, Tokyo; Masuo Ogihara, Chiba; Kozo Sato, Yotsukaido; Nobuo Shinozaki, Chiba; Yuzuru Takazawa, Togane; Yoichi Seki, Kamiiwahashi, all of Japan

[73] Assignee: Seiko Koki Kabushiki Kaisha, Japan

[21] Appl. No.: 654,224

[22] Filed: Feb. 2, 1976

[30] Foreign Application Priority Data

Feb. 7, 1975 Japan .................................. 50-15998
Feb. 7, 1975 Japan .................................. 50/15998

[51] Int. Cl.[2] ........................ G04C 3/00; H02K 33/00
[52] U.S. Cl. ....................................... 58/23 D; 310/36
[58] Field of Search .................. 58/23 R, 23 D, 23 V, 58/28 R, 28 A, 28 B, 28 D; 310/36-39

[56] References Cited

U.S. PATENT DOCUMENTS

| | | | |
|---|---|---|---|
| 2,934,688 | 4/1960 | Haerther et al. | 58/23 D X |
| 3,795,097 | 3/1974 | Meitinger | 58/23 D |

*Primary Examiner*—Stanley J. Witkowski
*Attorney, Agent, or Firm*—Robert E. Burns; Emmanuel J. Lobato; Bruce L. Adams

[57] ABSTRACT

A driving mechanism including a stepping motor having a rotor which rotates through a certain angular interval each time the stepping motor is energized. A driving member having a plurality of radial slots is mounted for rotation about an axis and is rotated by the rotor. A driven member is mounted for rotation and includes a pin extending therefrom for engaging one of the slots as the driving member rotates and for disengaging from the one of the slots after the driving member has rotated past the certain angular interval, whereby the driven member is rotated through the certain angular interval upon energization of the stepping motor. The driving member includes arcuate peripheral portions over a limited angular extent and concentric with the axis of rotation of the driving member. The driven member includes concave arcuate portions of limited angular extend spaced about the periphery thereof. The driven member is rotatable to a position so that one of the arcuate portions is concentric with the axis of rotation of the driving member and extends along and opposite an arcuate peripheral portion of the driving member for preventing rotation of the driven member when an arcuate peripheral portion of the driving member and one of the corresponding concave arcuate peripheral portions of the driven member are opposed when the stepping motor is not energized.

3 Claims, 4 Drawing Figures

F/G. 1

DRIVING MECHANISM FOR A TIMEPIECE

BACKGROUND OF THE INVENTION

The present invention relates to an improvement in a driving mechanism including a series of wheels of an electric clock to operate a clock pointer intermittently with a step motor.

In a hitherto used electric clock provided with a step motor wherein the rotor was rotated by a definite angle in one direction at each driving pulse, a method was generally used in which a pointer such as a second hand is operated intermittently by connecting a series of gear wheels to a pinion directly connected with the rotor. In this method, however, since the movement of the rotor is transferred as it occurs, when the rotor moving in step at each pulse is stopped, a vibration produced by the inertia thereof will be transmitted to the second hand so that it is difficult to observe the second hand.

Consequently, some means have been considered to resolve such a defect. One is a means of loading a frictional piece to a series of gear wheels to which the second hand is directly connected, or to make a click piece operate. But, as an unnecessary load is applied by either of them, it is necessary to enlarge the output of the step motor, which brings about a decrease in battery life if a battery is used. In another means where the inertia of the rotor is reduced as the size of the rotor should be minimized as far as possible, the output torque of the motor will become small so that there arises a disadvantage in reduced reliability. And in order to increase this torque characteristic, a magnetic material of high energy content should be used, resulting in high cost. Therefore the main object this invention consists in eliminating these defects. And the secondary object is to provide a driving mechanism in which the gear train beyond the driven wheel is not connected when the rotor is about to start its rotation so that the rotor starts under a no-load condition so that the starting characteristic of the rotor can be improved. And in a hitherto-used electric clock, in case of correcting the time, it was formerly needed to provide a mechanism in order to prevent the second hand from moving together with the second wheel prevented from rotating, simultaneously with pushing of the time-correcting button. Therefore the futher object of this invention is to remove the the requirement for this mechanism.

SUMMARY OF THE INVENTION

According to this invention, the aforementioned object has been achieved in the following way. Namely, a driving wheel operated by a step motor and a driven wheel that is connected to a timing wheel installed with a pointer and operated by the said driving wheel are provided, with coupling means including an intermittent driving mechanism for coupling the driving wheel or member with the driven wheel or member to rotate through an angular interval upon operation of the step motor and with means for fixing the angular position of the driven wheel or member and for preventing rotation of the driven member.

BRIEF DESCRIPTION OF THE DRAWINGS

The drawings show two embodiments of this invention, wherein.

DESCRIPTION OF THE PREFERRED EMBODIMENTS

Figure 1:
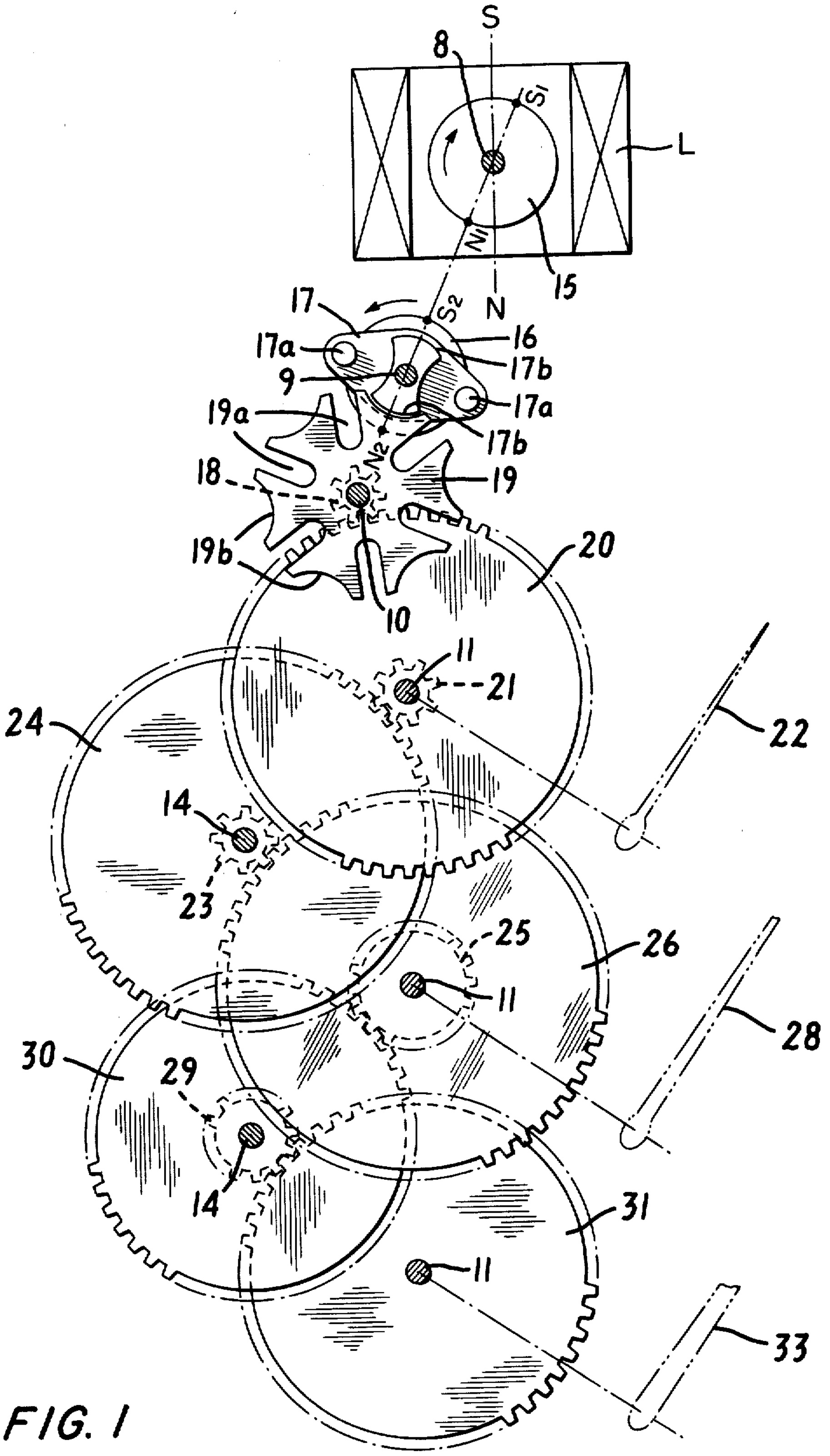
FIG. 1 shows a plan of the first embodiment.
Figure 2:
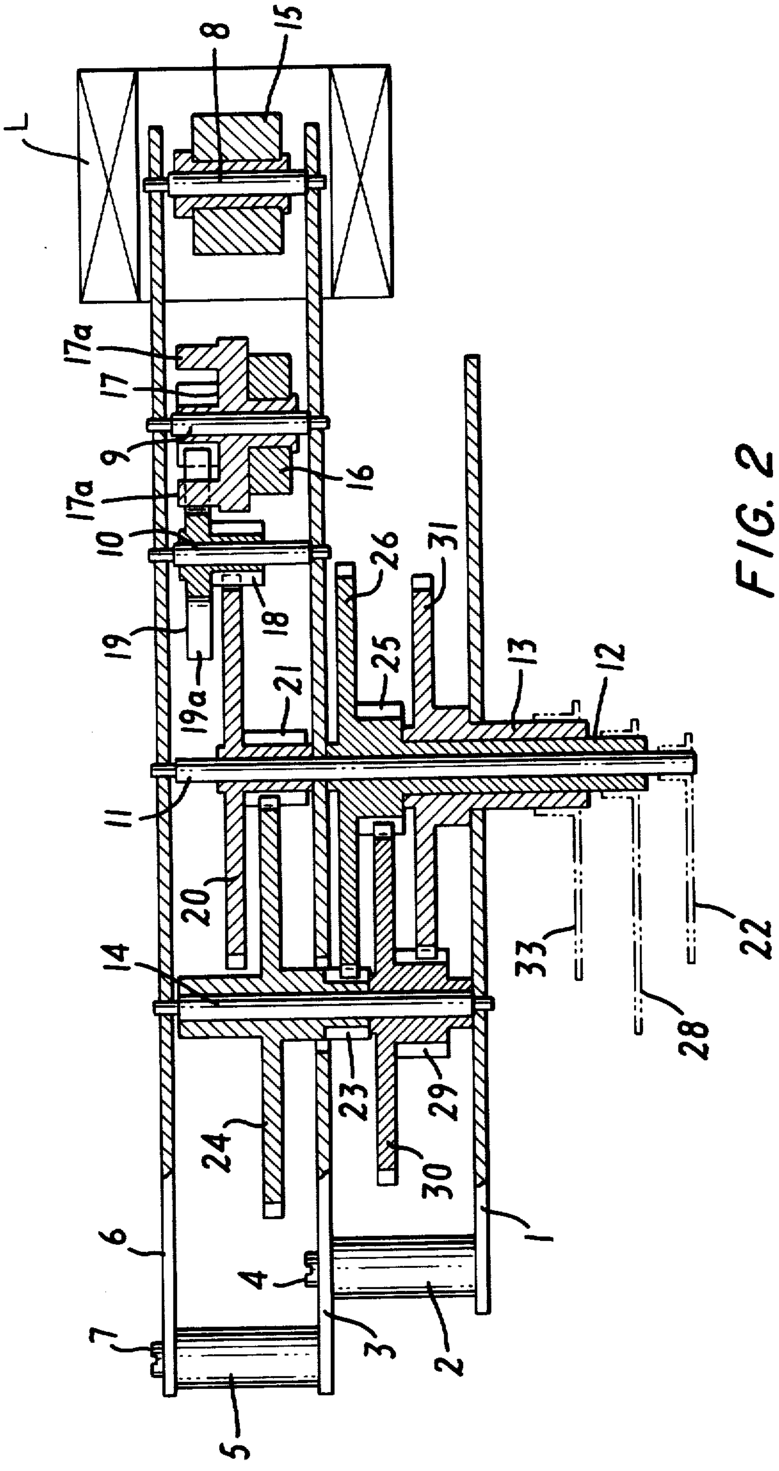
FIG. 2 a sectional view of FIG. 1.

FIG. 2 shows a cross section of FIG. 1 in column 2 is fixed on a base plate 1, an intermediate plate 3 having a second column 2 fixed thereto is fixed to the said column 2 by a screw 4, and an upper plate 6 is fixed to the said second column 2 by a screw 7. Shafts 8,9,10 and a second hand shaft 11 are rotatably supported by the said upper plate 6 and the intermediate plate 3, a minute hand shaft 12 and an hour hand shaft 13 are rotatably supported by the said second hand shaft 11 and the base plate 1 and are coaxial with said second hand shaft 11, and another shaft 14 is fitted to the base plate 1. To the said shaft 8 is fixed a first rotor 15 in which two poles are magnetized around the periphery. Also to the shaft 9 is fixed a driving wheel or member 17 to which a second rotor 16 is fixed and that is magnetized with two poles of N2,S2 corresponding to the said first rotor poles N1,S1. To the said driving wheel 17 are installed two pins *17a*, *17a* on a straight line and two fan-shaped parts *17b*, *17b* at nearly right angles to this straight line.

And to the shaft 10 is fixed a driven member or a star wheel 19 that is provided with a first pinion 18 and six radial slots or grooves *19a* which are engaged in operation by a pin *17a* of said driving wheel, as well as circular parts or concave arcuate portions *19b* which cooperate with part *17b*.

In a static state, as shown in FIG. 1, since one pole (e.g. N1-pole) of the first rotor and one pole (e.g. S2-pole) of the second rotor attracted to each other, the respective poles are present on a straight line connecting the shaft 9 and the shaft 10. Therefore, the pin of the driving wheel 17 is positioned apart from the groove *19a* of the star wheel and the fan-shaped part *17b* is positioned adjacent the circular portion *19b* of the star wheel periphery.

To the said second hand shaft 11 are fixed a second unit wheel 20 that is engaged with the first pinion 18 and a second pinion 21, and at the same time to the end of the second hand shaft 11 is fixed a second hand 22. Engaged with this second pinion 21 is an intermediate gear wheel 24 that is rotatable centered on the said shaft 14 and fixed with a third pinion 23. With the said third pinion 23 is engaged a minute unit wheel 26. Said minute unit wheel 26 is formed in a pipe shape and rotatable centered on the minute hand shaft 12 having a fourth pinion 25. Said second hand shaft 11 penetrates through the center of this pipe-shaped minute hand shaft 12, and at the end of the minute hand shaft 12 is fixed a minute hand 28.

With said fourth pinion 25 is engaged a second intermediate gear wheel 30 that is rotatable centered on the said shaft 14 and provided with fifth pinion 29. An hour unit wheel 31 is engaged with said fifth pinion 29, This hour hand shaft 13 is formed in a pipe shape, at the end thereof is fixed an hour hand 33, the outer diameter thereof is guided by the base plate 1 and furthermore, the minute hand shaft 12 penetrates through the center thereof.

Next, the action of such arrangement will be described in the following:

As mentioned previously, when there is no current in the coil L, the N1-and S1-poles of the first rotor 15 and the N2-and S2-poles of the second rotor 16 are arranged on a straight line connecting the respective axes 8,9 and the angle thereof is about 45° relative to the direction of the magnetic field of the coil L, When a current flows through the coil L under this condition, producing a S1-pole in the upper part and a N1-pole in the lower part as shown in FIG. 1, said first rotor 15 begins to rotate clockwise, thereby, since the N1-pole of the first rotor rotates clockwise, the S2-pole of the second rotor that is in an attractive relation with this rotor and starts a counterclockwise rotation following it.

Figure 3:
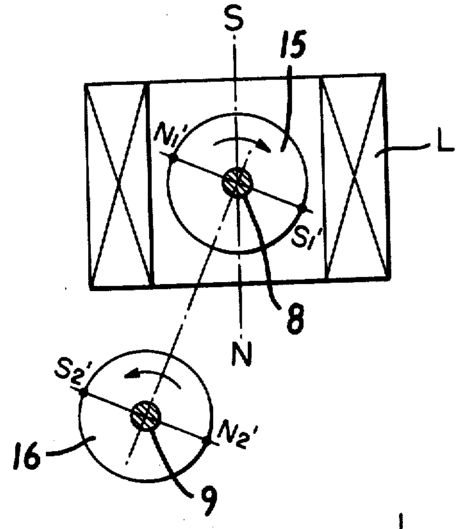
FIG. 3 a view of the operation of the 1st embodiment.
Figure 4:
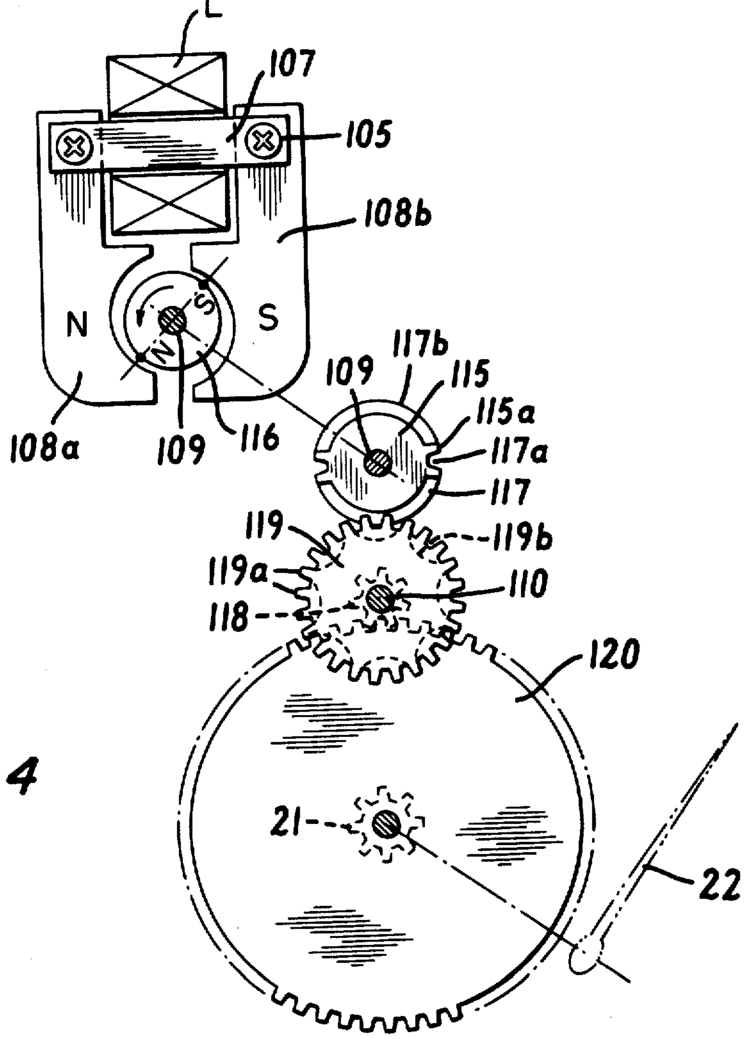
FIG. 4 a plan of the second embodiment.

At this time, since the pin 17*a* of the driving wheel 17 to which the second rotor 16 is fixed does not yet fit to the groove 19*a* of the star wheel, there exists a load in the coil L only at the first rotor 15 and the second rotor, that is, the driving wheel 17. Thereafter, when the driving wheel 17 rotates at a definite angle, the fan-shaped sustaining part 17*b* is released from fitting with the circular part 19*b* of the star wheel at the same time, the pin 17*a* of the driving wheel fits to the groove 19*a* of the star wheel, so that the counterclockwise rotation of the driving wheel 17 is transferred tp the star wheel 19 during its clockwise rotation. Furthermore, this rotation is transferred to the second hand 22 by a well-known means, that is, through a first pinion 18 and the second unit wheel 20, and to the minute hand 28 through the second unit wheel 20, the second pinion 21, the intermediate gear wheel 24, the third pinion and the minute unit wheel 26, and further to the hour hand 33 through the minute unit wheel 26, the fourth pinion 25, the second intermediate gear wheel 30, the fifth pinion 29 and the hour unit wheel 31, respectively. Thereafter, when the first rotor 15 and the second rotor 16 rotate, as shown in FIG. 3, up to a place exceeding a point where the lines connecting the respective poles (N1′ and S1′ and N2′ in the figure) become parallel, then, by the attractive force between the S-pole (S1′) of the first rotor and the N-pole (N2′) of the second rotor, the respective rotors are made to rotate. In such a process, the pin 17*a* is released from fitting to the groove 19*a* of the star wheel, completing the one step intermittent feeding. Thereafter, the rotors are rotated up to the position where the poles S1′ and N2′ of the respective rotors come to the shortest distance, but as the both rotors have inertia, they are subjected to oscillation. However, the said oscillation is not transferred to the star wheel 19, because the oscillation occurs within an angle narrower than the distance that the pin 17*a* has to travel to fit the groove 19*a*. After finishing such an oscillation, the first rotor 15 and the second rotor 16 continue to be at rest until a succeeding pulse of opposite direction flows through the coil L at the condition where the respective poles S1′,N2′ positioned with the shortest distance therebetween. It is remarked that in this embodiment, the angle up to fitting between the pin 17*a* of the driving wheel and the groove 19*a* of the star wheel is about 36°, but by setting the said angle wider than the width of oscillation of the second rotor 16, the object of this invention can be accomplished. FIG. 4 shows another embodiment, wherein, although the synchronous motor and the intermittent feeding mechanism are different from those of the first embodiment, the series of wheels beyond a second hand wheel 12° is the same as in the first embodiment.

A rotor 116 with two magnetized N,S poles around its periphery, a driving wheel 115 and a circular disk 117 are fixed to a shaft 109. Said driving wheel 115 has two sets of figure-place changing teeth 115*a*, and the circular disk 117 has a circular part 117*b* and a notched part 117*a* to be mentioned later. L is a coil to which an alternating current is applied, and an iron core 107 is inserted into this coil. And two sets of stators 108*a*, 108*b* are fixed to said iron core 107 by means of screws 105, and semicircular magnetic poles for the rotor 116 are formed in the stators as the center of the semicircle of these magnetic poles is different from the center of the rotor, as shown in the figure, the rotor is, in a static state, stopped at the position where the said magnetic poles and the poles of the rotor are located closest to each other. On the other hand an idler 119 having toothless parts 119*b* and teeth 119*a* at eight positions and a first pinion 118 are fixed around the whole circumference of a shaft 110. And in a static state, the driving wheel 115 and the circular disk 117 are at a position where the figure feeding action is not performed as shown in the figure in correspondance with the stopping position of said rotor. Conversely, the toothless parts 119*b* of the idler 119 and the circular part 117*b* of said circular disk 117 correspond to each other, and the two teeth 119*a* of the idler existing at both sides of the toothless parts fit with said circular part 117*b*. And, similarly as in the first embodiment, the second unit gear wheel 120, the second pinion 121 and the second hand 122 are fixed to a shaft 111. Since the series of wheels beyond said second pinion is constructed in an entirely similar manner as in the first embodiment the details thereof are omitted here.

In the first place, in a static state when there is no current flowing through the coil L, as the poles S, N of the rotor 116 are stopped at a position closest to the inner surface of the stators 108*a*, 108*b*, the rotor 116 is caused to stop at an angle of about 45° the center of the magnetic fieled of each stator.

In this state when a current flows through the coil L in the direction such that an N-pole is produced in the stator 108*a* and an S-pole is produced in the stator 108*b* the rotor 116 begins to rotate counterclockwise. At this time, since the figure-place raising tooth 115*a* is in a position not to fit with the tooth 119*a* of the idler, only the driving wheel 115 and the circular disk 117 start their rotation and the series of wheels beyond the idler 119 remains at a standstill. In this way when the roller 115 rotates a definite angle, the fitting between the circular disk 117 and the tooth 119*a* of the idler 119 is released, and at the same time the figure-place raising tooth 115*a* of the driving wheel 115 fits with the tooth 119*a* of the idler. Therefore, the rotation of the rotor 116 is transferred thereafter to the series of wheels beyond the idler 119. And, when the rotor 116 is rotated further by a specified angle, the fitting of the figure-place raising tooth 115*a* of the driving wheel with the tooth 119*a* of the idler is interrupted, and the circular part 117*b* of the circular disk 117 and the tooth 119*a* of the idler are fitted again, causing the rotation of the idler 119 to stop. The rotation of the idler 119 thus transferred at a definite angle is transferred to the second hand wheel as a rotation angle corresponding to one second on the dial. And, after the idler 119 is stopped, the rotor 116 is still rotatable and continues its rotation up to the position removed from the initial position by 180°, where the poles opposite to those in the initial position come to the closest position to the poles of the stator respectively. This state of standstill is kept until a current of opposite direction to the case previously mentioned is applied to the coil L.

We claim :

1. A driving mechanism, for use in a timepiece, comprising: an electrical stepping motor having a rotor which rotates in one direction through a predetermined angular interval each time said stepping motor is energized; a driving member mounted for rotation and driven by said rotor to rotate as said rotor rotates; a driven member mounted for rotation and driven to rotate by said driving member; a time wheel having a pointer for indicating time and driven to rotate upon rotation of said driven member; and said driving member and said driven member together including means comprising an intermittent driving mechanism for enabling said driving member to drive said driven member only during a portion of the predetermined angle of rotation of said driving member.

2. A driving mechanism according to claim 1, wherein said driving member has a plurality of peripheral shifting teeth and circular peripheral portions; and said driven member includes a first set of peripheral teeth for engaging said shifting teeth, and a second set of peripheral teeth spaced to engage said circular peripheral portions, and said driving and driven members being relatively positioned so that a circular peripheral portion engages said second set of peripheral teeth when said driving member is stopped.

3. A driving mechanism according to claim 1, wherein said driving member is mounted for rotation about an axis and includes a plurality of pins spaced circumferentially about said axis and a plurality of fan-shaped positioning portions disposed radially about said axis; said driven member is mounted for rotation about an axis and has a plurality of radial slots spaced about said axis and peripheral circular concave portions each between a respective pair of said slots; and said driving and said driven members are relatively positioned so that said pins engage said slots to rotate said driven member when said driving member rotates, and a fan-shaped positioning portion engages a respective one of said concave circular portions when said driving member is stopped to prevent rotation of said driven member.

* * * * *